Patented Apr. 3, 1934

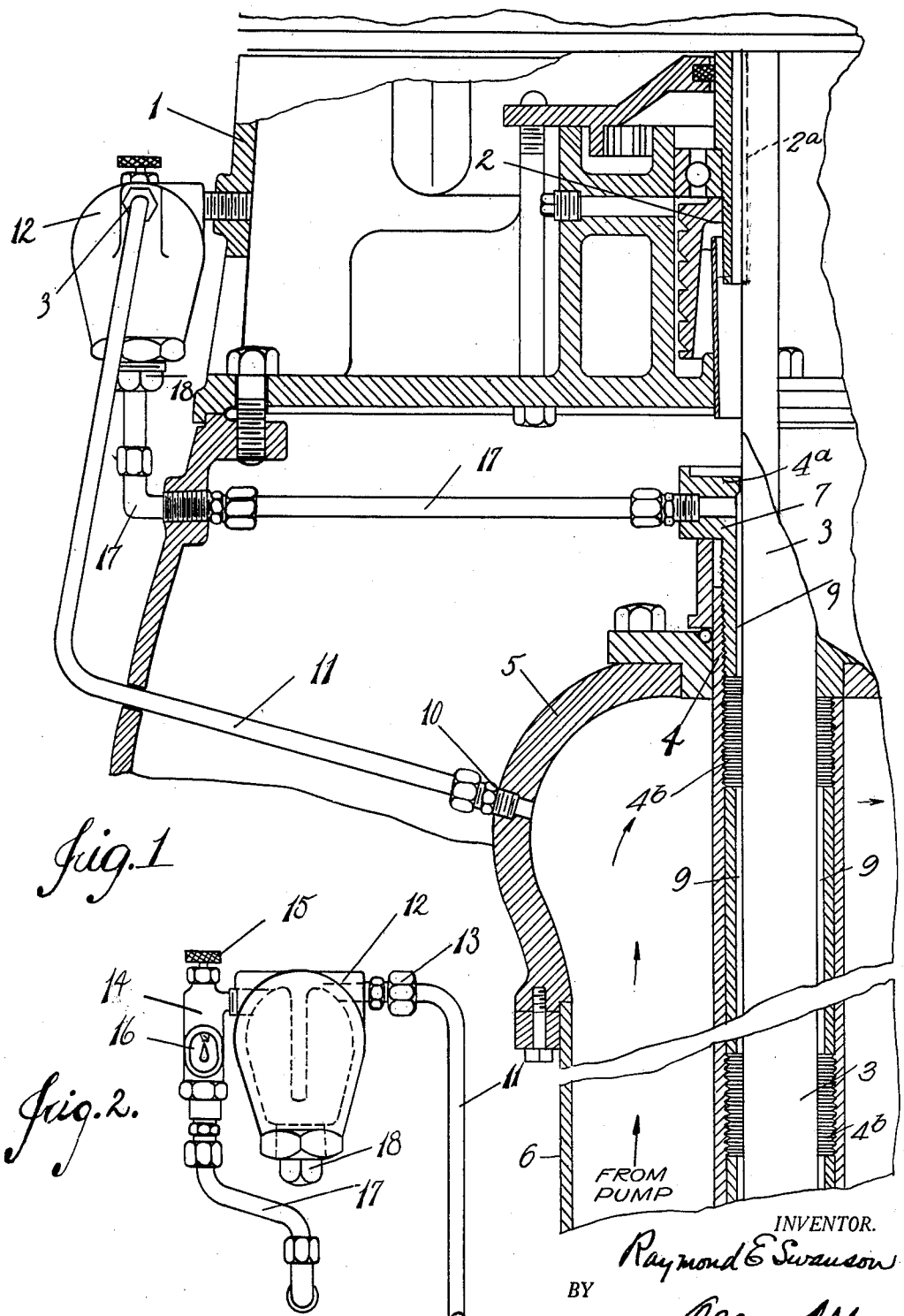

1,953,447

UNITED STATES PATENT OFFICE 1,953,447

WATER LUBRICATION SYSTEM FOR DEEP WELL TURBINE PUMPS

Raymond E. Swanson, Lawrenceburg, Ind., assignor to A. D. Cook, Inc., Lawrenceburg, Ind., a corporation of Indiana Application August 23, 1930, Serial No. 477,350

2 Claims. (Cl. 184—6)

My invention relates to the lubrication of deep well pumps with water, and specifically to a lubrication system in which the water is freed from sand prior to its use as a lubricant.

Probably the most usual type of deep well turbine pumps is what is called the enclosed line shaft type, in which the shaft bearings form a coupling for the enclosing pipe or oil tube, so that I have illustrated my invention in connection with this type of pump.

In this type of pump provision is often made for introducng oil to the line shaft bearings between the shaft and the enclosing tube at the top, so that oil flows down through the tube and lubricates the shaft bearing. This type of construction, in which oil is used as a lubricant, ordinarily gives long service because of adequate lubrication and because the shaft is protected from the water. There are, however, a number of instances where a turbine user will not consider putting any oil whatever down into his well for fear of contamination or the undesirable mixing of the water pumped with the lubricating oil. There are numerous other instances, where for other reasons the use of oil as a lubricant is undesirable, and water must be used.

It is an object of my invention to provide a gravity feed lubricating system for the enclosed shaft type turbine in which a measured quantity of water is delivered by gravity to the space between the line shaft and the enclosing tube. A further object of my invention is to so filter or treat the lubricating fluid prior to its admission to the pump so that it will be free from grit and other ingredients of the water pumped which will tend to induce wear of the line shaft bearings.

Further it is my object to so introduce my lubricating water that water pressure is not built up within the enclosing tube or bearings through which the line shaft passes, which will cause friction and require more power to operate.

The above objects and other objects to which reference will be made in the ensuing disclosure, I accomplish by that certain combination of parts and by the use of that system which I have illustrated in connection with a deep well turbine pump of the enclosed line shaft type.

Referring to the drawing:

Figure 1 is a fragmentary side elevation of the pump head with parts in section showing the inner construction.

Figure 2 is a side elevation of a sight feed lubricator which has been found to be satisfactory in the use of my lubricating system.

In Figure 1 I have shown the pump head or casing 1 understood to support a pump-driving means, within which casing is enclosed the shaft support 2 which couples the driving means with the line shaft 3 at 2a, which shaft extends down through the tube 4 having a bearing 4a at its top for this shaft. The discharge elbow 5 connects with the well casing 6, up through which water is discharged from the pump, not shown but understood, as is usual in the art, to be coupled to the lower part of shaft 3, down in the well.

I have shown the type of pump head in which the enclosing tube cap nut 7 screws into the enclosing tube, and in which a space 9 extends down along the line shaft to the space between the shaft bearings 4b enclosed within the enclosing tube 4 at intervals down therealong.

Water is pumped up through the pump casing 6, and out through the discharge elbow 5 in the usual manner. Communicating with this elbow 5 I have inserted the coupling member 10 to which is connected a water pipe 11.

The water pipe 11 is coupled to a water filter having a casing 12 by means of a coupling member 13. A sight feed lubricator indicated at 14 is connected with the filter casing and by means of a thumb adjusting screw 15 the droppage of filtered water may be seen through the sight glass 16, from which it passes by gravity through the tube 17 and is connected to a passage 9 in the enclosing tube cap nut 7, by which a limited supply of water free from grit and sand is dropped by gravity so as to lubricate the line shaft bearings 4b, to drain therethrough and from the lowermost bearings, below the pump, into the suction tube of the pump.

The filter shown has a nut 18 communicating with a passage in the lower part of the casing by which any sand or grit which settles out in the casing during the passage of the pumped water therethrough may be drained.

While I have shown only one type of pump installation and one particular type of filtering vessel, it should be understood that the principle of applying non-gritty or non-corrosive water through a feed control valve by gravity to the line shaft bearings of the well pump with the air substantially excluded may be modified as to the particular size, shape and arrangement of parts, while still employing the principle of my invention. Other arrangements for filtering the water pumped and then returning it in a measured gravity flow to the line shaft bearings will occur to others skilled in the art without departing from the principle of my invention.

Having thus described my invention, what I claim as new and desire to secure by Letters Patent is:

1. In combination with a deep well pump comprising a water discharge pipe, a line shaft, bearings for said shaft, one above the other, a casing enclosing said shaft and said bearings and providing water passages to the respective bearings, each bearing being so arranged as to permit substantially complete drainage of water away therefrom, a conduit system conducting water from said discharge pipe into an upper one of said passages, including means for purifying the conducted water and means for restricting the flow of said conducted water to a rate below the conducting capacity of said passages and the drainage capacity of said bearings, whereby a steady lubrication of the bearings is afforded without accumulation of water in said passages and at said bearings.

2. In combination with a deep well pump comprising a water discharge pipe, a line shaft, bearings for said shaft, one above the other, a casing enclosing said shaft and said bearings and providing water passages to the respective bearings, each bearing being so arranged as to permit substantially complete drainage of water away therefrom, a conduit system conducting water from said discharge pipe into an upper one of said passages, including means for purifying the conducted water and means for restricting the flow of said conducted water to a rate below the conducting capacity of said passages and the drainage capacity of said bearings, whereby a steady lubrication of the bearings is afforded without accumulation of water in said passages and at said bearings, said conduit system being constructed so as to susbtantially prevent admission of air to the water while being conducted.

RAYMOND E. SWANSON.